United States Patent
Hama

(10) Patent No.: US 12,260,569 B2
(45) Date of Patent: Mar. 25, 2025

(54) INFORMATION PROCESSING DEVICE, INFORMATION PROCESSING SYSTEM, AND NON-TRANSITORY COMPUTER READABLE MEDIUM

(71) Applicant: FUJIFILM Business Innovation Corp., Tokyo (JP)

(72) Inventor: Daigo Hama, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 400 days.

(21) Appl. No.: 17/584,158

(22) Filed: Jan. 25, 2022

(65) Prior Publication Data

US 2023/0097831 A1    Mar. 30, 2023

(30) Foreign Application Priority Data

Sep. 28, 2021   (JP) ................................. 2021-157470

(51) Int. Cl.
*G06T 7/30* (2017.01)
*G06T 7/70* (2017.01)
*G06V 10/75* (2022.01)

(52) U.S. Cl.
CPC .................. *G06T 7/30* (2017.01); *G06T 7/70* (2017.01); *G06V 10/75* (2022.01); *G06T 2207/30242* (2013.01)

(58) Field of Classification Search
CPC .. G06T 7/001; G06T 7/30; G06T 7/70; G06T 2207/30242; G06T 7/337; G06V 10/75
See application file for complete search history.

(56) References Cited

U.S. PATENT DOCUMENTS

| | | | |
|---|---|---|---|
| 2014/0023265 A1* | 1/2014 | Kitazawa | G06T 7/0004 382/151 |
| 2020/0196857 A1* | 6/2020 | Orlowski | A61B 3/0058 |
| 2020/0302584 A1* | 9/2020 | Zhang | G06F 18/214 |
| 2021/0181086 A1* | 6/2021 | Chou | G01N 15/1484 |
| 2022/0169049 A1* | 6/2022 | Kuo | B41J 11/008 |
| 2023/0215027 A1* | 7/2023 | Kim | A61C 9/0053 382/128 |

FOREIGN PATENT DOCUMENTS

| | | |
|---|---|---|
| JP | 2005-268470 A | 9/2005 |
| JP | 2009-223461 A | 10/2009 |
| JP | 5409237 B2 | 2/2014 |

\* cited by examiner

*Primary Examiner* — Margaret G Webb
(74) *Attorney, Agent, or Firm* — Oliff PLC

(57) ABSTRACT

An information processing device includes a processor configured to: acquire information related to image periodicity included in data of a first image and data of a second image to be compared; and correct predetermined information for aligning the data of the first image and the data of the second image on a basis of the information related to image periodicity.

13 Claims, 6 Drawing Sheets

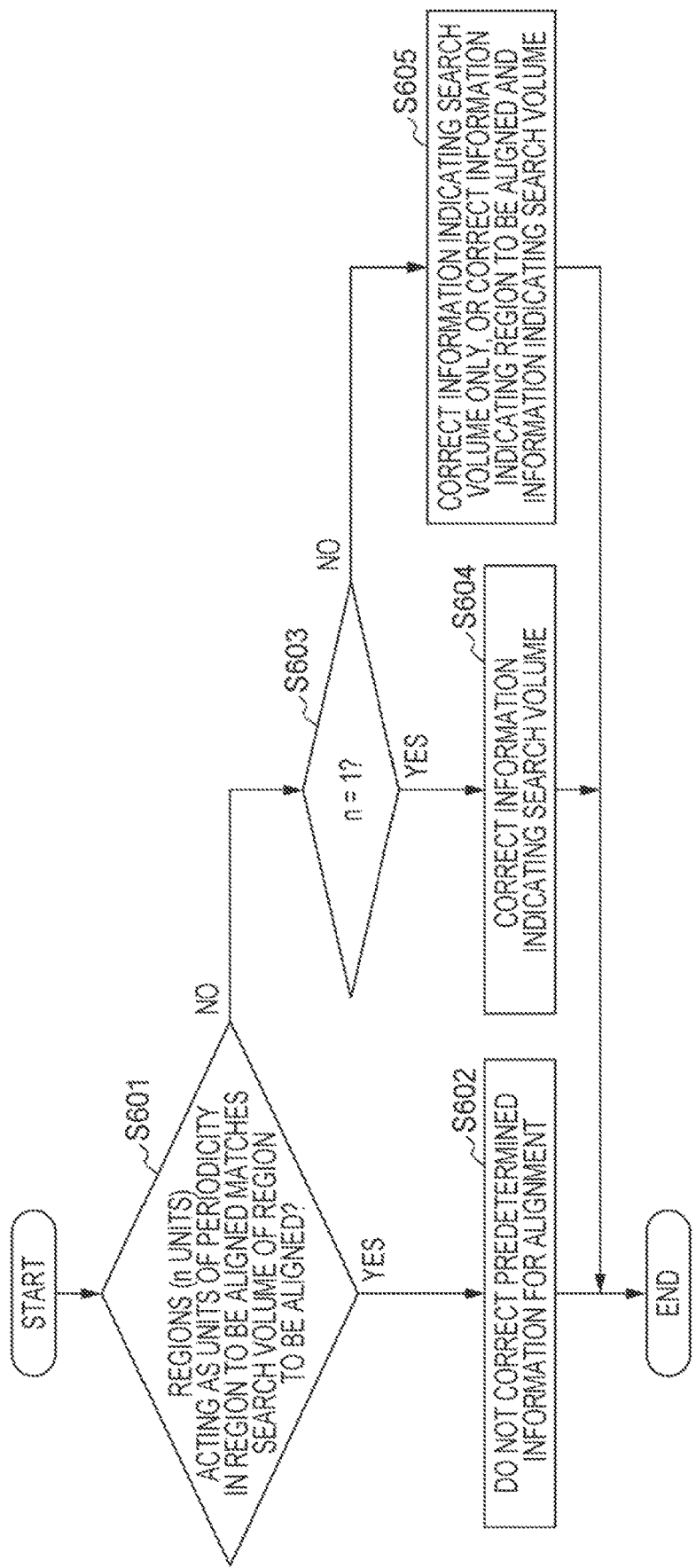

INFORMATION PROCESSING DEVICE, INFORMATION PROCESSING SYSTEM, AND NON-TRANSITORY COMPUTER READABLE MEDIUM

CROSS-REFERENCE TO RELATED APPLICATIONS

This application is based on and claims priority under 35 USC 119 from Japanese Patent Application No. 2021-157470 filed Sep. 28, 2021.

BACKGROUND (i) Technical Field

The present disclosure relates to an information processing device, an information processing system, and a non-transitory computer readable medium.

(ii) Related Art

In the related art, an inspection is performed to determine whether or not an image has been printed correctly by printing equipment (for example, see Japanese Patent No. 5409237). Such an inspection may involve comparing the data of the image to be printed to scan data of the printed image to detect inexpediences that may occur in the printed image.

SUMMARY

However, in such a comparison, it may be necessary to remove positional differences between the images to be compared, or in other words, what is called "alignment" may be necessary, but in the case where the images to be compared have periodicity, the images may be aligned at an unintended position.

Aspects of non-limiting embodiments of the present disclosure relate to aligning the data of two images having periodicity for comparison so as to reduce the possibility that the alignment will be performed at an unintended position compared to the case where alignment is performed without consideration for periodicity.

Aspects of certain non-limiting embodiments of the present disclosure address the features discussed above and/or other features not described above. However, aspects of the non-limiting embodiments are not required to address the above features, and aspects of the non-limiting embodiments of the present disclosure may not address features described above.

According to an aspect of the present disclosure, there is provided an information processing device including a processor configured to: acquire information related to image periodicity included in data of a first image and data of a second image to be compared; and correct predetermined information for aligning the data of the first image and the data of the second image on a basis of the information related to image periodicity.

BRIEF DESCRIPTION OF THE DRAWINGS

An exemplary embodiment of the present disclosure will be described in detail based on the following figures, wherein:

FIG. 6 is a flowchart illustrating a flow of an information correction process among the processes by the image processing device.

DETAILED DESCRIPTION

Hereinafter, an exemplary embodiment of the present disclosure will be described in detail and with reference to the attached drawings.

(Configuration of Information Processing System)

Figure 1:
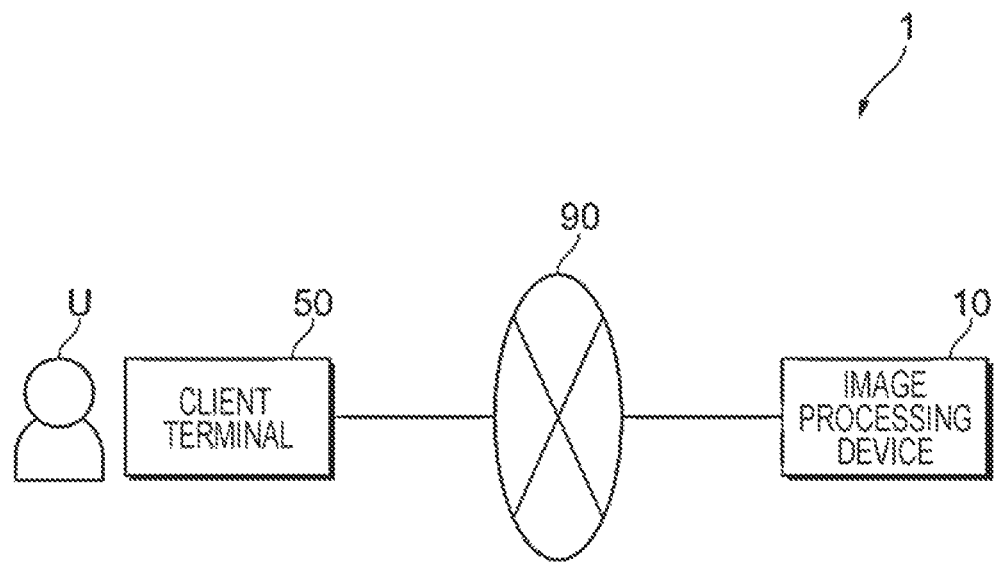
FIG. 1 is a diagram illustrating an overall configuration of an information processing system to which an exemplary embodiment is applied.

FIG. 1 is a diagram illustrating an overall configuration of an information processing system 1 to which the present exemplary embodiment is applied.

The information processing system 1 includes an image processing device 10 and a client terminal 50 connected over a network 90. The network 90 is a network such as a local area network (LAN) or the Internet, for example. Note that the image processing device 10 and the client terminal 50 may also be connected directly without going through the network 90 by a communication method such as infrared communication, visible light communication, near field communication, Bluetooth (registered trademark), or RFID (registered trademark), for example. Also, although only a single client terminal 50 is illustrated in FIG. 1, multiple client terminals 50 may be connected to the network 90.

The image processing device 10 is an information processing device including a function of forming an image on a recording medium, a function of reading an image formed on a recording medium, a function of transmitting and receiving image information through communication, and the like as basic functions. The image information transmitted and received by the image processing device 10 includes the data of an image to be formed on a recording medium, information relevant to forming an image on a recording medium, and the like. Examples of the information relevant to forming an image on a recording medium include the size of the outputted recording medium, the color mode (for example, full color or black and white) when the image is formed, and the number of copies to be outputted. Note that in the present exemplary embodiment, the recording medium is paper.

When performing a process of forming an image onto paper as the recording medium (hereinafter referred to as "printing"), the image processing device 10 inspects whether or not the printing has been performed correctly. Specifically, the data of the image to be printed is treated as the data of a correct image while the data of an image generated by a process of reading the image printed onto the paper is treated as the data of the image to be inspected, and the two sets of data are compared. Additionally, the presence or absence of an inexpediency in the process of printing is determined on the basis of a difference detected from the result of comparing the two sets of data. The difference is detected according to a predetermined detection condition. Examples of inexpediencies in the printing process include "specks" caused by ink or the like adhering to unintended locations, "voids" in locations where printing is missing, and "light print" in locations where printing is incomplete.

The image processing device 10 performs the following process in the above inspection. Namely, the image processing device 10 acquires information related to image periodicity included in the data of the correct image treated as the data of a first image to be compared and the data of the image to be inspected treated as the second image to be compared. "Image periodicity" refers to a repeating pattern of the same or similar colors, shapes, characters, or the like occurring in an image.

On the basis of the acquired information related to image periodicity, the image processing device 10 corrects predetermined information for an alignment to be performed when comparing the data of the correct image to the data of the image to be inspected. Thereafter, the image processing device 10 controls the alignment of the data of the correct image and the data of the image to be inspected on the basis of the corrected content. Note that specific details about the process by the image processing device 10 will be described later.

The client terminal 50 is an information processing device such as a personal computer, a tablet, or a smartphone operated by a user U. The client terminal 50 creates or acquires the data of an image to be printed by the image processing device 10 on the basis of operations by the user U. Thereafter, the client terminal 50 causes printing to be performed by transmitting the created or acquired data of an image together with information relevant to printing (such as the paper size, the color mode, and the number of copies to be outputted, for example) to the image processing device 10.

The client terminal 50 also receives and outputs a determination result transmitted from the image processing device 10. Specifically, the client terminal 50 receives and outputs a result of determining the presence or absence of an inexpediency in the printing process for each character transmitted from the image processing device 10. For example, the client terminal 50 displays the determination result transmitted from the image processing device 10 on a display in a form visible to the user U.

Note that the functions of the device and terminal forming the information processing system 1 described above are an example, and it is sufficient if the functions described above are provided for the information processing system 1 as a whole. For this reason, some or all of the functions described above may also be executed in a distributed or cooperative way within the information processing system 1. For example, some or all of the functions of the image processing device 10 may be functions of the client terminal 50. In addition, some of all of the functions of the image processing device 10 may also be delegated to a server or the like not illustrated. This arrangement makes it possible to expedite processes by the information processing system 1 as a whole, and also cause processes to complement each other.

(Hardware Configuration of Image Forming Device)

Figure 2:
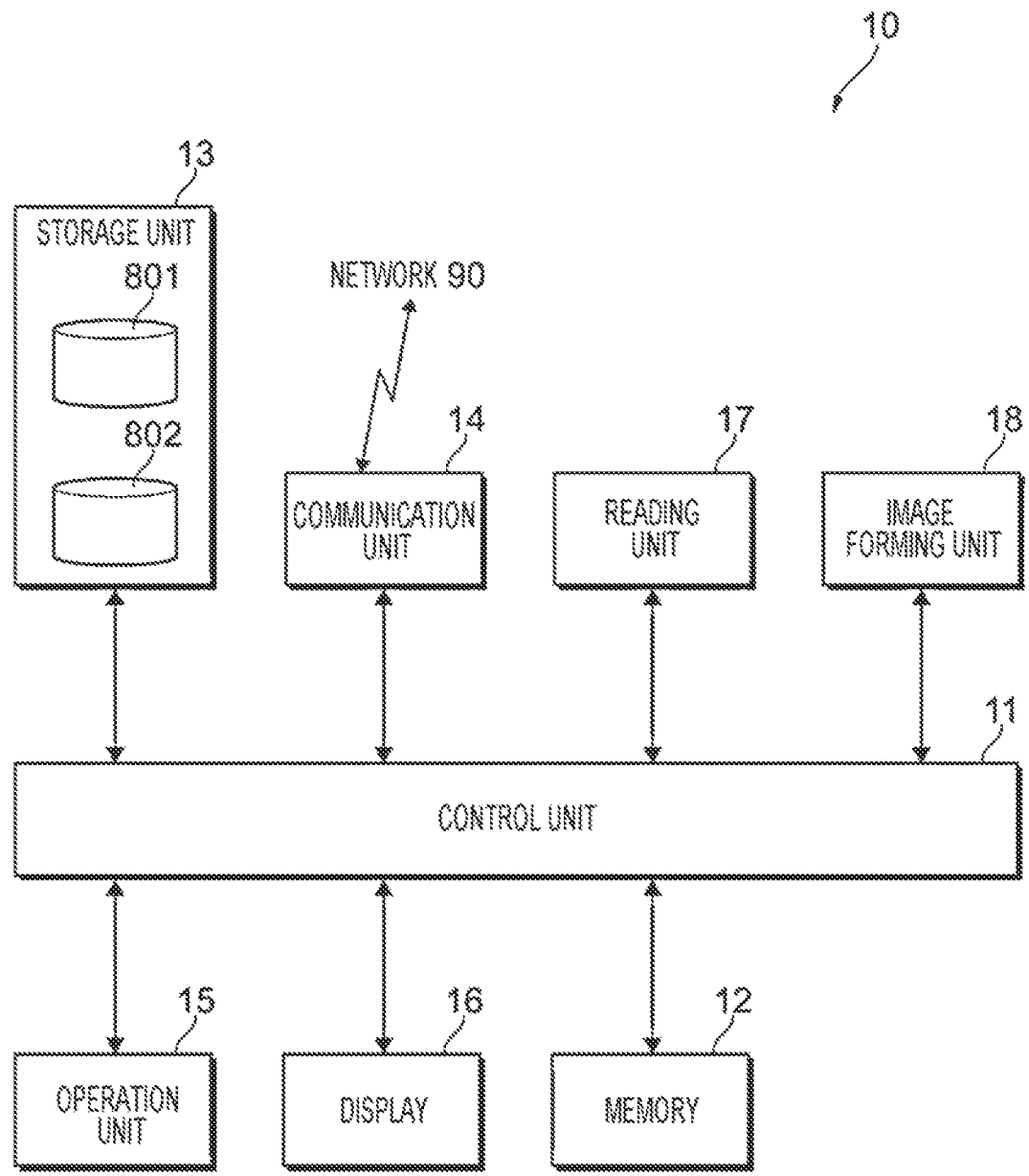
FIG. 2 is a diagram illustrating a hardware configuration of an image processing device.

FIG. 2 is a diagram illustrating a hardware configuration of the image forming device 10.

The image processing device 10 includes a control unit 11, a memory 12, a storage unit 13, a communication unit 14, an operation unit 15, a display 16, a reading unit 17, and an image forming unit 18. These components are connected by a data bus, an address bus, a Peripheral Component Interconnect (PCI) bus, and the like.

The control unit 11 is a processor that controls operations by the image processing device 10 through the execution of various software such as an operating system (OS; basic software) and application software. The control unit 11 includes a central processing unit (CPU), for example. The memory 12 is a storage area that stores various software and data used in the execution thereof, and is used as a work area when performing computations. The memory 12 is random access memory (RAM), for example.

The storage unit 13 is a storage area that stores information such as input data for various software and output data from various software, and for example, an image database (DB) 801 and an alignment information DB 802 are stored as databases for storing various information. In the image DB 801, the data of the correct image is stored in association with the data of the image to be inspected. Also, in the alignment information DB 802, predetermined information for the alignment performed when comparing the data of the correct image to the data of the image to be inspected is stored.

The storage unit 13 includes a component such as a hard disk drive (HDD), a solid-state drive (SSD), or semiconductor memory used to store information such as programs and various setting data, for example. The communication unit 14 transmits and receives data over the network 90 or according to a communication method such as infrared communication. The communication unit 14 transmits and receives data with respect to the client terminal 50 (see FIG. 1) and external equipment.

The operation unit 15 includes a keyboard, a mouse, and mechanical buttons and switches, for example, and receives input operations. The operation unit 15 also includes a touch sensor forming a touch panel integrated with the display 16. The display 16 displays images, text information, and the like. The display 16 is a device such as a liquid crystal display or an organic electroluminescence (EL) display used to display information, for example.

The reading unit 17 reads an image recorded onto paper as a recording medium. The reading unit 17 is a device such as a charge-coupled device (CCD) scanner in which light from a light source is radiated onto a document and the reflected light therefrom is focused by a lens and sensed by a CCD, or a contact image sensor (CIS) scanner in which light from LED light sources is successively radiated onto a document and the reflected light therefrom is sensed by a CIS.

The image forming unit 18 forms an image onto a recording medium. Specifically, for example, the image forming unit 18 forms and outputs an image based on image information onto paper treated as the recording medium according to what is called an electrophotographic system that forms a toner image onto the paper, according to what is called an inkjet system that propels ink onto the paper, or the like. The image processing device 10 includes the image forming unit 18 that forms an image onto paper treated as the recording medium, and therefore functions as an image forming device.

(Hardware Configuration of Client Terminal)

The hardware configuration of the client terminal 50 is provided with a similar configuration to the hardware configuration of the image processing device 10 illustrated in FIG. 2, with the exception of the reading unit 17 and the image forming unit 18. For this reason, an illustration and description of the hardware configuration of the client terminal 50 is omitted.

(Functional Configuration of Control Unit of Image Processing Device)

Figure 3:
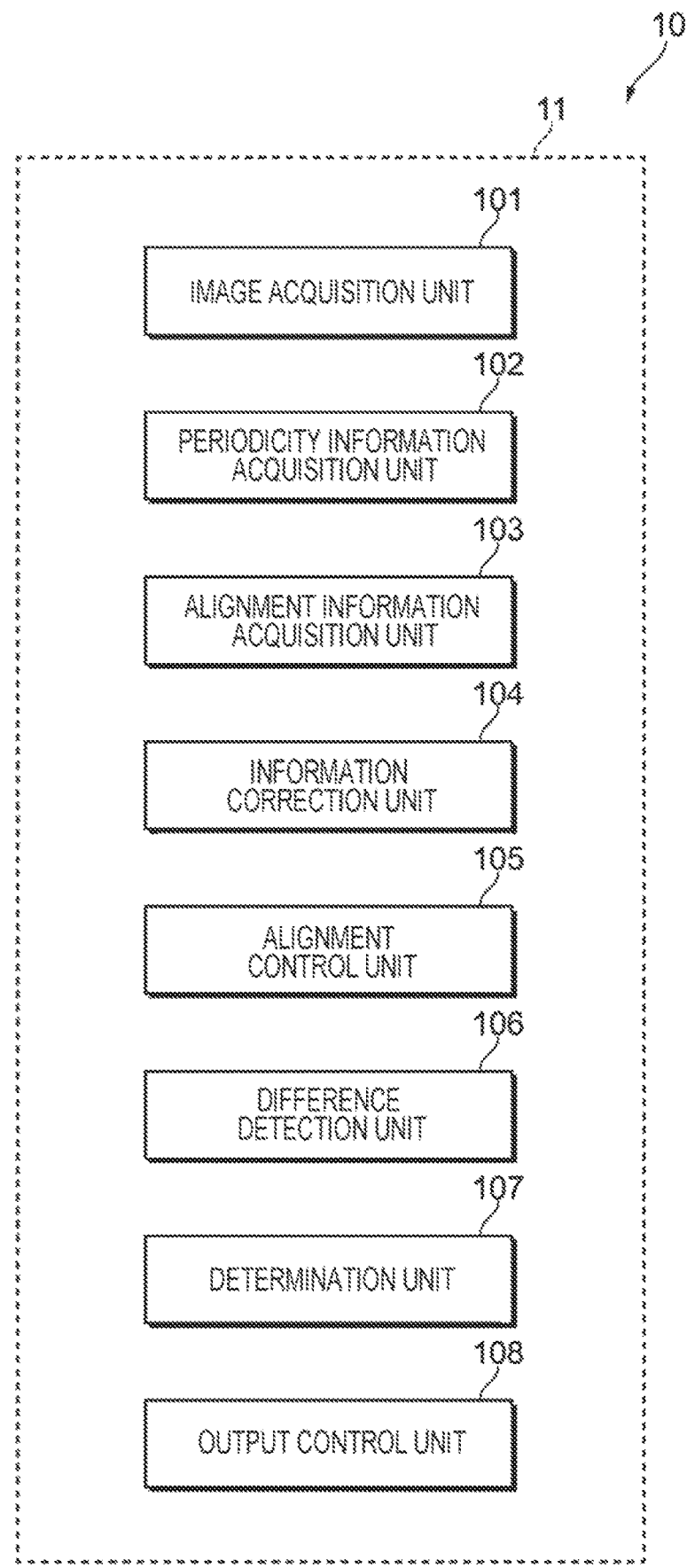
FIG. 3 is a diagram illustrating a functional configuration of a control unit of the image processing device.

FIG. 3 is a diagram illustrating a functional configuration of the control unit 11 of the image processing device 10.

The control unit 11 of the image processing device 10 functions as an image acquisition unit 101, a periodicity information acquisition unit 102, an alignment information acquisition unit 103, an information correction unit 104, an alignment control unit 105, a difference detection unit 106, a determination unit 107, and an output control unit 108.

The image acquisition unit 101 acquires the data of the correct image and the data of the image to be inspected which are to be compared. Specifically, the image acquisition unit 101 acquires the data of the correct image stored in advance in the image DB 801 (see FIG. 2) of the storage unit 13. As described above, the data of the correct image is the data of an image that is created or acquired by the client terminal 50, and then transmitted to the image processing device 10 for printing.

The periodicity information acquisition unit 102 acts as an acquirer that acquires the information related to image periodicity included in the data of the correct image and the data of the image to be inspected which are acquired by the image acquisition unit 101. Specifically, the periodicity information acquisition unit 102 acquires the information related to image periodicity from information related to an object included in the data of the correct image and the data of the image to be inspected, information related to a frequency of the data of the correct image and the data of the image to be inspected, or information inputted separately by the user U.

Of the information acquired by the periodicity information acquisition unit 102, the information related to an object in the data of the correct image and the data of the image to be inspected includes, for example, information about what is called tiling, in which a single image is printed multiple times, information about what is called N-up, in which multiple images are printed together on a single sheet, or the like. Also, the information related to a frequency of the data of the correct image and the data of the image to be inspected includes, for example, information obtained by frequency analysis of an image converted by a Fourier transform process that converts from the spatial domain to the spatial frequency domain, and the like.

The information related to image periodicity acquired from the information related to an object included in the data of the correct image and the data of the image to be inspected, the information related to a frequency of the data of the correct image and the data of the image to be inspected, or the information inputted separately by the user U includes, for example, information about the position, size, and number of a region that acts as a periodic unit. The "region that acts as a periodic unit" refers to a region indicating the smallest unit of a pattern of the same or similar colors, shapes, characters, or the like. For example, in an image in which a pattern containing the single letter "a" is arranged repeatedly, the region where the single letter "a" exists is the "region that acts as a periodic unit".

The alignment information acquisition unit 103 acquires predetermined information for the alignment. Specifically, the alignment information acquisition unit 103 acquires predetermined information for the alignment performed when comparing the data of the correct image and the data of the image to be inspected, which is stored in the alignment information DB 802 of the storage unit 13 (see FIG. 2).

The information correction unit 104 acts as a corrector that corrects the predetermined information for aligning the data of the correct image and the data of the image to be inspected on the basis of the information related to image periodicity acquired by the periodicity information acquisition unit 102. Specifically, as the predetermined information for aligning the data of the correct image and the data of the image to be inspected, the information correction unit 104 corrects at least one of information indicating a region to be aligned between the data of the correct image and the data of the image to be inspected and information indicating a search volume of a region to be aligned. Hereinafter, the process of correcting the predetermined information for aligning the data of the correct image and the data of the image to be inspected may be referred to as the "information correction process" in some cases.

As the information correction process, the information correction unit 104 may consider the consistency of shape and size between a region to be aligned and the region that acts as a periodic unit when correcting information indicating a region to be aligned between the data of the correct image and the data of the image to be inspected, and also when correcting information indicating a search volume of the region to be aligned. For example, in the case where the region to be aligned and the region that acts as a periodic unit are of a consistent shape and size, and the search volume of the region to be aligned also matches, the information correction unit 104 determines that the issue of alignment at an unintended position will not occur. For this reason, the information correction unit 104 does not correct the predetermined information for the alignment.

As another example, in the case where the region to be aligned and the region that acts as a periodic unit are of a consistent shape and size, but the search volume of the region to be aligned is too large, the information correction unit 104 determines that there is a possibility that alignment at an unintended position may occur. For this reason, the information correction unit 104 corrects the information indicating the search volume of the region to be aligned. In this case, the information correction unit 104 corrects the information so as to narrow the search volume of the region to be aligned.

Also, when correcting the information indicating the region to be aligned between the data of the correct image and the data of the image to be inspected, and also when correcting the information indicating the search volume of the region to be aligned, the information correction unit 104 may reference information indicating an outer edge of the paper on which the image to be inspected is printed. For example, the information correction unit 104 references the information indicating the outer edge of the paper on which the image to be inspected is printed as a substitute for attaining fewer incorrect position determinations from only template matching described later.

To correct the information indicating the region to be aligned, the information correction unit 104 may, for example, cause the shape and size of the region to be aligned to match the shape and size of the region that acts as a periodic unit. As another example, to correct the information indicating the search volume of the region to be aligned, the information correction unit 104 may cause the shape and size of the region indicating the search volume to match the shape and size of the region to be aligned. Note that a specific example and the flow of the information correction process by the information correction unit 104 will be described later with reference to FIGS. 5 and 6.

In the case where the predetermined information for aligning the data of the correct image and the data of the image to be inspected is acquired or is corrected by the information correction unit 104, the alignment control unit 105 controls the alignment in the comparison between the data of the correct image and the data of the image to be inspected on the basis of the correction information about the predetermined information for aligning the data of the correct image and the data of the image to be inspected.

The difference detection unit 106 uses a predetermined detection condition to control the detection of the difference between the data of the correct image and the data of the image to be inspected. The determination unit 107 determines the presence or absence of an inexpediency in the process of printing by the image processing device 10. Specifically, the determination unit 107 determines the presence or absence of an inexpediency in the process of printing by the image processing device 10 by determining the presence or absence of an inexpediency in the printing process for each character on the basis of the difference detected by the difference detection unit 106.

The output control unit 108 controls the outputting of the determination by the determination unit 107. Specifically, the output control unit 108 controls the transmission of the determination result to the client terminal 50 and causes the determination result to be outputted to the client terminal 50. For example, the output control unit 108 controls the display of the client terminal 50 to display the determination result in a form visible to the user U.

(Processes by Image Processing Device)

Figure 4:
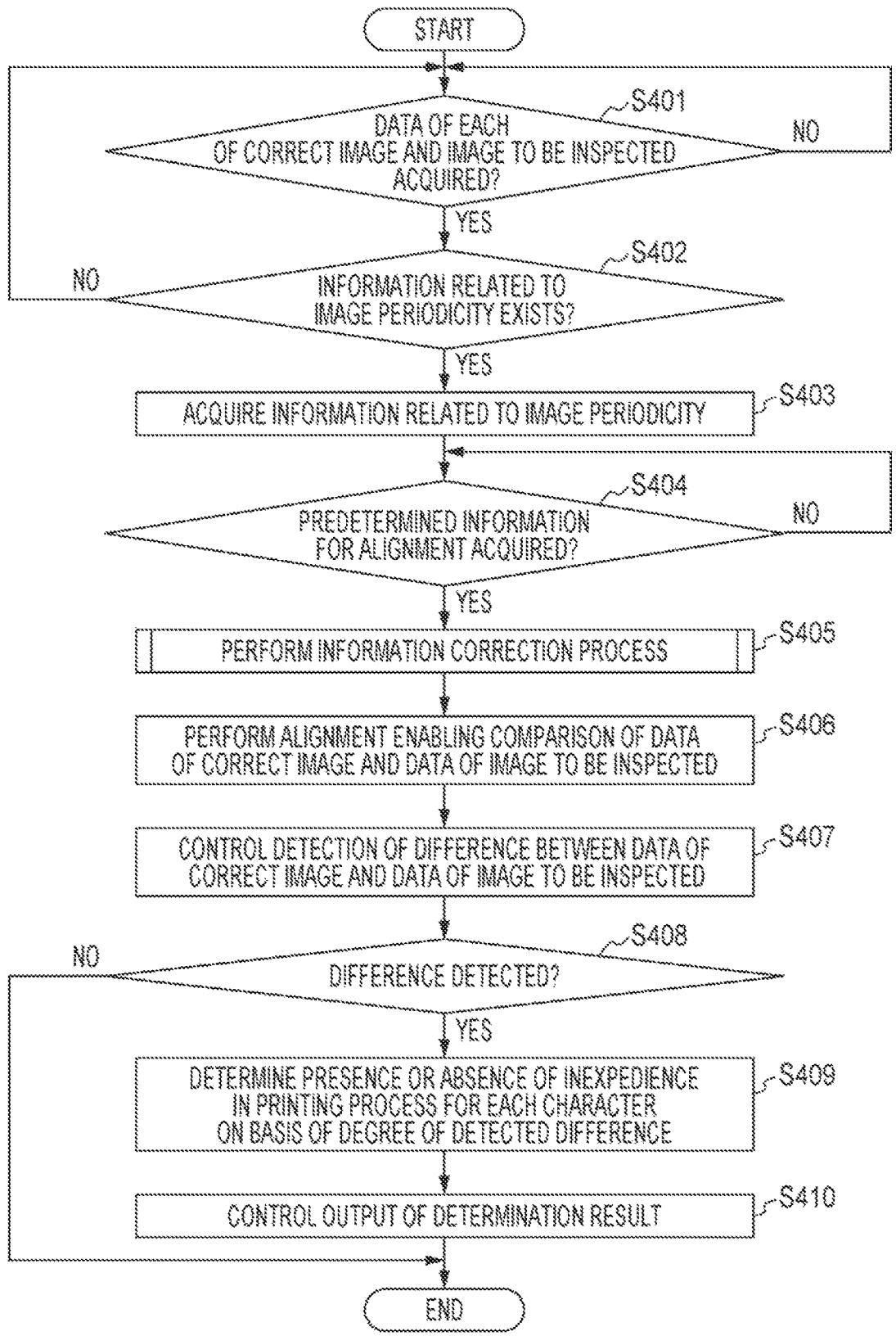
FIG. 4 is a flowchart illustrating an overall flow of processes by the image processing device.

FIG. 4 is a flowchart illustrating an overall flow of processes by the image processing device 10.

The image processing device 10 acquires the data of each of the correct image and the image to be inspected (step 401, YES), and if information related to image periodicity exists in the data of the images acquired in step 401 (step 402, YES), the image processing device 10 acquires the information related to image periodicity (step 403). In contrast, in the case where the data of each of the correct image and the image to be inspected is not acquired (step 401, NO), the image processing device 10 repeats the process of step 401 until the data of each of the correct image and the image to be inspected is acquired. Also, in the case where information related to image periodicity does not exist in the data of the images acquired in step 401 (step 402, NO), the image processing device 10 returns to the process of step 401.

If predetermined information for aligning the data of the correct image and the data of the image to be inspected is acquired (step 404, YES), the image processing device 10 performs the information correction process (step 405). Note that the details of the flow of the information correction process will be described later with reference to FIG. 6. In contrast, in the case where the predetermined information for aligning the data of the correct image and the data of the image to be inspected is not acquired (step 404, NO), the image processing device 10 repeats the process of step 404 until the predetermined information for aligning the data of the correct image and the data of the image to be inspected is acquired.

The image processing device 10 performs alignment enabling comparison of the data of the correct image and the data of the image to be inspected, on the basis of the information corrected by the information correction process of step 405 or the uncorrected information, that is, the predetermined information for aligning the data of the correct image and the data of the image to be inspected (step 406). Additionally, the image processing device 10 uses a predetermined detection condition to control the detection of the difference between the data of the correct image and the data of the image to be inspected (step 407).

If a difference between the data of the correct image and the data of the image to be inspected is detected (step 408 YES), the image processing device 10 determines the presence or absence of an inexpediency in the printing process for each character on the basis of the degree of the detected difference (step 409), and controls the outputting of the determination result (step 410). In contrast, in the case where a difference between the data of the correct image and the data of the image to be inspected is not detected (step 408, NO), the process ends.

(Information Correction Process)

Figure 5:
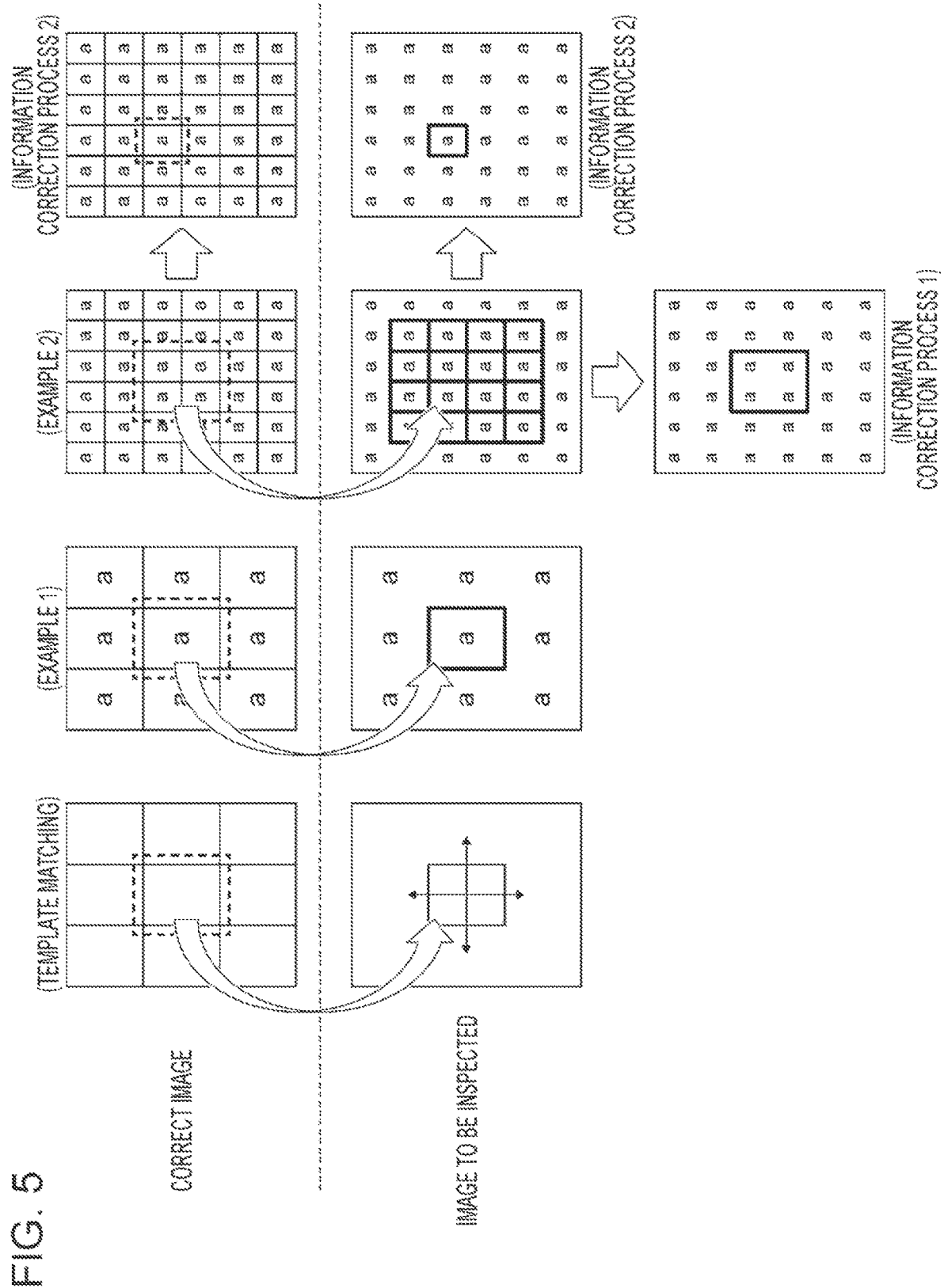
FIG. 5 is a diagram illustrating a specific example of an information correction process.

FIG. 5 is a diagram illustrating a specific example of the information correction process.

The information correction process of step 405 in FIG. 4 described above is the process of correcting the predetermined information for aligning the data of the correct image and the data of the image to be inspected. To align the data of the correct image and the data of the image to be inspected, a technique referred to as template matching is used. Additionally, information indicating the outer edge of the paper and the like is used as auxiliary information for template matching. With this arrangement, a reduction in incorrect position determinations from only template matching may be attained.

Template matching refers to searching an entire image to determine whether or not an image with the same pattern as a partial image exists. For example, in the correct image under (Template Matching) in FIG. 5, the rectangular portion enclosed by dashed lines is treated as the partial image and the entirety of the image to be inspected underneath is treated as the entire image. In this case, the region indicated by the partial region is the region to be aligned. Note that information indicating the region to be aligned is stored in the alignment information DB 802 (see FIG. 2) in the storage unit 13 of the image processing device 10 as the predetermined information for the alignment.

In template matching, a search is performed to determine whether or not an image with the same pattern as a partial image exists in an entire image. Specifically, a search is performed by overlaying the partial image onto the entire image and determining whether or not an image with same pattern exists in the entire image while moving the partial image in the directions of the arrows. How far to search is indicated as the search volume of the region to be aligned. Note that information indicating the search volume of the region to be aligned is stored in the alignment information DB 802 (see FIG. 2) in the storage unit 13 of the image processing device 10 as the predetermined information for the alignment.

In the case of using the template matching method to align an image in which a pattern containing the letter "a" is arranged periodically, for example, a process like the following is performed. First, (Example 1) in FIG. 5 is an example of the case of aligning an image in which the pattern of the letter "a" is arranged three times each horizontally and vertically, for a total of nine patterns. In this example, the partial image indicating the region to be aligned is a region (1 unit) that acts a periodic unit, and furthermore, the search volume of the region to be aligned is also a region (1 unit) that acts as a periodic unit.

In this case, the partial image and the region to be aligned are of a consistent size and shape, and therefore the issue of alignment at an unintended position will not occur. For this reason, the predetermined information for the alignment is not corrected. Note that information indicating that the region that acts as a periodic unit is n units (where n is an integer value equal to or greater than 1) is stored in the alignment information DB 802 (see FIG. 2) in the storage unit 13 of the image processing device 10 as the predetermined information for the alignment.

Next, (Example 2) in FIG. 5 is an example of the case of aligning an image in which the pattern of the letter "a" is arranged six times each horizontally and vertically, for a total of 36 patterns. In this example, the partial image indicating the region to be aligned is a region (4 units) that acts a periodic unit, whereas the search volume of the region to be aligned is a region (16 units) that acts as a periodic unit. In this case, the search volume of the region to be aligned contains multiple regions matching the region (4 units) that acts as a periodic unit, and consequently there is a possibility that alignment at an unintended position may occur. Accordingly, an information correction process like the following is performed.

The following two examples are specific examples of the information correction process in (Example 2) in FIG. 5. Of these, the first example is an example of correcting the information indicating the search volume of the region to be aligned. In this example, the shape and size of the region indicating the search volume is corrected to match the shape and size of the region to be aligned. Specifically, as illustrated by (Information Correction Process 1), the number of units (that is, n units) of the region that acts as a periodic unit indicating the search volume of the region to be aligned is corrected from 16 units to 4 units. With this arrangement, the partial image and the region to be aligned are made to match each other similarly to (Example 1) described above, thereby suppressing alignment at an unintended position.

The second example is an example of correcting the information indicating the region to be aligned and also correcting the information indicating the search volume of the region to be aligned. In this example, the shape and size of the region to be aligned is corrected to match the shape and size of the region (1 unit) that acts as a periodic unit, and additionally, the shape and size of the region indicating the search volume is corrected to match the shape and size of the region to be aligned.

Specifically, as illustrated by (Information Correction Process 2), the partial image indicating the region to be aligned is narrowed to correct the region that acts as a periodic region from 4 units to 1 unit. Also, the number of units (that is, n units) of the region that acts as a periodic unit indicating the search volume of the region to be aligned is corrected from 16 units to 1 unit. With this arrangement, the shape and size of the partial image and the region to be aligned are made to match each other similarly to (Example 1) described above, thereby suppressing alignment at an unintended position.

FIG. 6 is a flowchart illustrating a flow of the information correction process among the processes by the image processing device 10. Hereinafter, the flow of the information correction process will be described with reference to the specific examples of FIG. 5 described above.

The information correction process in step 405 of FIG. 4 described above is a process of correcting the predetermined information for aligning the data of the correct image and the data of the image to be inspected on the basis of the information related to image periodicity, and is performed according to a flow like the one illustrated in FIG. 6.

In the case where the region (n units) that acts as a periodic unit treated as the region to be aligned matches the search volume of the region to be aligned (step 601, YES), the information correction process is ended without correcting the predetermined information for the alignment (step 602). This is a process corresponding to (Example 1) of FIG. 5, for example.

In contrast, in the case where the search volume of the region to be aligned is larger than the region (n units) that acts as a periodic unit treated as the region to be aligned (step 601, NO), and n=1 (step S603, YES), the image processing device 10 corrects the information indicating the search volume (step 604). Specifically, the image processing device 10 performs the correction by narrowing the search volume such that the search volume matches the region (1 unit) that acts as a periodic unit treated as the region to be aligned.

Also, in the case where n is 2 or greater (step 603, NO), the image processing device 10 corrects the information indicating the search volume only or corrects the information indicating the region to be aligned and the information indicating the search volume (step 605). Specifically, in the case of correcting the information indicating the search volume only, the image processing device 10 performs the correction by narrowing the search volume to match the region to be aligned, as in (Information Correction Process 1) of FIG. 5 described above, for example. Also, in the case of correcting the information indicating the region to be aligned and the information indicating the search volume, the image processing device 10 performs the correction by narrowing the region to be aligned and also narrowing the search volume such that the two match, as in (Information Correction Process 2) of FIG. 5 described above, for example. According to the above, the information correction process ends and the flow proceeds to the process of step 406 in FIG. 4 described above.

The above describes an exemplary embodiment, but the present disclosure is not limited to the exemplary embodiment described above. Moreover, the effects exhibited by embodiments of the present disclosure of the present disclosure are not limited to those indicated in the exemplary embodiment described above. For example, the configuration of the information processing system 1 illustrated in FIG. 1 and the hardware configuration of the image processing device 10 illustrated in FIG. 2 are merely illustrative examples of achieving an objective of the present disclosure and are not particularly limiting. Moreover, the functional configuration of the image processing device 10 illustrated in FIG. 3 is also merely a non-limiting illustrative example and is not particularly limiting. It is sufficient if the information processing system 1 in FIG. 1 is provided with functions enabling the execution of the processes described above as a whole, and the specific functional configuration for achieving the functions is not limited to the example in FIG. 3.

In addition, the order of the steps of the processes by the image processing device 10 illustrated in FIGS. 4 and 6 is merely an illustrative example and is not particularly limiting. The processes not only may be performed in a time series following the order of the steps illustrated in the drawings, but also may be performed in parallel or individually without strictly being processed in a time series. Also, the specific examples of the information correction process illustrated in FIG. 5 are merely examples and are not particularly limiting.

Additionally, in the exemplary embodiment described above, the paper to be read for inspection by the image processing device 10 is paper that has been printed by the image processing device 10 itself, but the paper is not limited thereto and may also be paper that has been printed by another image processing device 10. In this case, the data of the correct image data is acquired from the image processing device 10 that performed the printing, the client terminal 50 that initially created the data of the correct image, or the like through a server not illustrated or an external storage medium or the like.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing device comprising:
    a processor configured to:
        acquire information related to image periodicity included in data of a first image and data of a second image to be compared, the information including at least (i) a periodic unit which is a region that acts as a periodic unit of a pattern identified in the first image, and (ii) a search volume which is a region to be searched in the second image;
        compare a size of the search volume and a size of the periodic unit;
        in response to determining that a size of the search volume is larger than a size of the periodic unit, determine that a correction to predetermined information for aligning the data of the first image and the data of the second image is needed, and perform the correction; and
        in response to determining that the size of the search volume is not larger than the size of the periodic unit, determine that the correction to the predetermined information for aligning the data of the first image and the data of the second image is not needed, and not perform the correction.

2. The information processing device according to claim 1, wherein the processor is configured to acquire the information related to image periodicity from at least one of information related to an object included in the data of the first image and the data of the second image, information related to a frequency of the data of the first image and the data of the second image, and separately inputted information.

3. The information processing device according to claim 1, wherein the processor is configured to acquire at least one of a position, a size, and a number of the region that acts as the periodic unit, as the information related to image periodicity.

4. The information processing device according to claim 1, wherein the data of the second image is data of an image generated by reading the first image formed on a recording medium outputted from an image forming device.

5. The information processing device according to claim 4, wherein the processor is configured to treat the data of the first image as data of a correct image, treat the data of the second image as data of an image to be inspected, and control the alignment for the comparison.

6. The information processing device according to claim 1, wherein the processor is configured to correct at least one of a region to be aligned and the search volume as the correction to the predetermined information.

7. The information processing device according to claim 6, wherein, when performing the correction, the processor is configured to account for a consistency of shape and size between the region to be aligned and the region that acts as the periodic unit.

8. The information processing device according to claim 6, wherein the processor is configured to cause a shape and size of the region to be aligned to match a shape and size of the region that acts as the periodic unit as the correction to the predetermined information.

9. The information processing device according to claim 6, wherein the processor is configured to cause a shape and size of the search volume to match a shape and size of the region to be aligned as the correction to the predetermined information.

10. The information processing device according to claim 6, wherein, when performing the correction, the processor is configured to reference information indicating an outer edge of a recording medium on which the second image is formed.

11. The information processing device according to claim 1, wherein the processor is configured to perform the correction so that the size of the search volume matches the size of the periodic unit.

12. An information processing system comprising:
    an acquirer that acquires information related to image periodicity included in data of a first image and data of a second image to be compared, the information including at least (i) a periodic unit which is a region that acts as a periodic unit of a pattern identified in the first image, and (ii) a search volume which is a region to be searched in the second image; and
    a corrector that:
        compares a size of the search volume and a size of the periodic unit;
        in response to determining that a size of the search volume is larger than a size of the periodic unit, determines that a correction to predetermined information for aligning the data of the first image and the data of the second image is needed, and performs the correction; and
        in response to determining that the size of the search volume is not larger than the size of the periodic unit, determines that the correction to the predetermined information for aligning the data of the first image and the data of the second image is not needed, and does not perform the correction.

13. A non-transitory computer readable medium storing a program causing a computer to execute a process comprising:
    acquiring information related to image periodicity included in data of a first image and data of a second image to be compared, the information including at least (i) a periodic unit which is a region that acts as a periodic unit of a pattern identified in the first image, and (ii) a search volume which is a region to be searched in the second image;

comparing a size of the search volume and a size of the periodic unit;

in response to determining that a size of the search volume is larger than a size of the periodic unit, determining that a correction to predetermined information for aligning the data of the first image and the data of the second image is needed, and performing the correction; and in response to determining that the size of the search volume is not larger than the size of the periodic unit, determining that the correction to the predetermined information for aligning the data of the first image and the data of the second image is not needed, and not performing the correction.

\* \* \* \* \*